F. R. Moorhead,

Vulcanizing App's.

No. 105,115. Patented July 5, 1870.

Witnesses: L. Hailer, Phil. T. Dodge.

Inventor
F. R. Moorhead
by Dodge & Munn
his Atty's.

United States Patent Office.

FRANCIS R. MOORHEAD. OF CHANDLERSVILLE, OHIO.

Letters Patent No. 105,115, dated July 5, 1870.

IMPROVEMENT IN SAFETY-VALVES FOR DENTAL VULCANIZERS.

The Schedule referred to in these Letters Patent and making part of the same

To all whom it may concern:

Be it known that I, FRANCIS R. MOORHEAD, of Chandlersville, in the county of Muskingum and State of Ohio, have invented certain Improvements in Dental Vulcanizing Devices, of which the following is a specification, reference being had to the accompanying drawing, in which—

My invention consists in the novel construction and arrangement, in combination with dental vulcanizing devices, of a valve, with an adjustable spring, so that it shall serve as a safety-valve.

Figure 1:
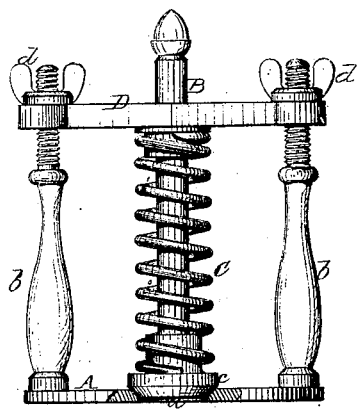
Figure 1 is a side elevation of my device, with a portion broken away.

A represents the top of the vulcanizer, upon which I mount, rigidly, two uprights $b$, having screw-threads cut upon their upper ends, and through the top A, midway between the posts, I make a conical hole or seat $a$, as shown in fig. 1.

Into the seat $a$ I insert the valve-head $c$, attached to or formed upon the lower end of the stem B, and over and around the stem B I place a spiral spring, C, the lower end of which rests upon the head $c$, as shown in fig. 1.

Figure 2:
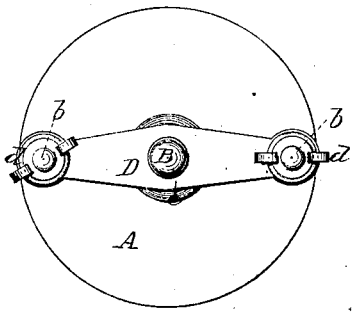
Figure 2 is a top plan view of the same.

I then provide a bar, D, having three holes made through it, and place it over the ends of the posts $b$ and stem B, so that they pass through it, as shown in figs. 1 and 2, and then screw onto the ends of the posts $b$ thumb-nuts $d$, as shown.

When thus arranged, the bar D serves both as a guide for the stem B and as a bearing for the upper end of the spring C, which latter is thereby caused to press the valve $c$ into the seat $a$, as shown in fig. 1.

By turning the nuts $d$, the bar D may be forced down or allowed to rise, and thus the tension of the spring C be regulated at will.

The valve, thus constructed, being applied to a vulcanizer, will remain closed until the pressure of the steam becomes sufficient to overcome the spring, when the valve $c$ will rise, and permit steam to escape through the hole or seat $a$, and thus will prevent the pressure of the steam from becoming so great as to rupture the vessel, or the heat becoming so great as to injure the articles in process of vulcanization.

The stem B I provide with graduations, and figures, or characters, so that, when the bar D is forced down in line with any one of these lines or graduations, the figure or character belonging thereto will show the pressure which the steam must attain to open the valve, this arrangement enabling the operator to set his valve for any pressure with ease and certainty.

Having thus described my invention,

What I claim is—

1. In combination with a dental vulcanizing device or apparatus, a movable safety-valve, when constructed and arranged to operate substantially as herein described, and for the purpose set forth.

2. The movable valve $c$, spring C, cross-bar D, and standards $b$, or their equivalents, in combination with a dental vulcanizer, when constructed and arranged to operate substantially as and for the purpose set forth.

FRANCIS R. MOORHEAD.

Witnesses:
G. P. CRUMBAKER,
F. W. VOGT.